United States Patent
Yamaguchi et al.

(10) Patent No.: US 7,061,568 B2
(45) Date of Patent: Jun. 13, 2006

(54) METHOD FOR PRODUCING LIQUID CRYSTAL DISPLAY

(75) Inventors: Shuichi Yamaguchi, Shiojiri (JP); Michihisa Ueda, Mishima-gun (JP)

(73) Assignees: Sekisui Chemical Co., Ltd., Osaka (JP); Microjet Corporation, Nagano (JP)

(*) Notice: Subject to any disclaimer, the term of this patent is extended or adjusted under 35 U.S.C. 154(b) by 0 days.

(21) Appl. No.: 10/535,181

(22) PCT Filed: Sep. 22, 2003

(86) PCT No.: PCT/JP03/12045

§ 371 (c)(1),
(2), (4) Date: Jul. 25, 2005

(87) PCT Pub. No.: WO2004/046804

PCT Pub. Date: Jun. 3, 2004

(65) Prior Publication Data

US 2006/0001824 A1 Jan. 5, 2006

(30) Foreign Application Priority Data

Nov. 18, 2002 (JP) ............................. 2002-334074

(51) Int. Cl.
*G02F 1/1339* (2006.01)

(52) U.S. Cl. ........................ 349/155; 427/466

(58) Field of Classification Search ................ 349/155
See application file for complete search history.

(56) References Cited

U.S. PATENT DOCUMENTS

| | | | |
|---|---|---|---|
| 6,280,799 B1 | 8/2001 | Okabe et al. | |
| 2002/0140893 A1* | 10/2002 | Yi et al. ..................... | 349/155 |
| 2005/0213021 A1* | 9/2005 | Myoung ..................... | 349/155 |

FOREIGN PATENT DOCUMENTS

| JP | 57-58124 | 4/1982 |
|---|---|---|
| JP | 4-198919 | 7/1992 |
| JP | 6-258647 | 9/1994 |
| JP | 10-339878 | 12/1998 |
| JP | 11-281985 A | 10/1999 |
| JP | 2000-246887 A | 9/2000 |
| JP | 2000-288451 A | 10/2000 |
| JP | 2000-347191 A | 12/2000 |
| JP | 2001-51280 A | 2/2001 |
| JP | 2002-207217 A | 7/2002 |

* cited by examiner

*Primary Examiner*—James A. Dudek
(74) *Attorney, Agent, or Firm*—Sughrue Mion, PLLC

(57) ABSTRACT

It is an object of the present invention to provide a method of fabricating a liquid crystal display by which a liquid crystal display capable of displaying a high quality display image with high resolution and preventing light leakage, light omission and the like due to spacers may be produced.

The present invention relates to a method of fabricating a liquid crystal display, which has a step of locating a spacer on a substrate by ejecting a droplet of spacer dispersion liquid containing a spacer with a particle diameter R (μm) from a nozzle of an ink-jet apparatus and depositing the droplet on the substrate surface, a hole diameter of the nozzle being 7R (μm) or larger, the spacer dispersion liquid having surface tension of 30 to 50 mN/m and a contact angle θ on the substrate surface of 30 to 90° and, in the step of locating the spacer on the substrate, depositing the droplet of the spacer dispersion liquid on the substrate surface at the interval of deposition D (μm) satisfying a relationship of the following formula (1):

$$D \geq 35 \times \left[\frac{R}{2 - 3\cos\theta + \cos^3\theta}\right]^{1/3}. \quad (1)$$

2 Claims, 1 Drawing Sheet

(a) In the case the meniscus is not axially symmetric.

(b) In the case the meniscus is axially symmetric (the case that the nozzle diameter is large relatively to the particle diameter).

METHOD FOR PRODUCING LIQUID CRYSTAL DISPLAY

TECHNICAL FIELD

The present invention relates to a method of fabricating a liquid crystal display by which a liquid crystal display capable of displaying a high quality display image with high resolution and preventing light leakage, light omission and the like due to spacers may be produced.

BACKGROUND ART

Presently, the liquid crystal display has been used widely for personal computers, portable electronic appliances, and the like. The liquid crystal display generally comprises, as shown in FIG. 1, a transparent electrode 3, an alignment layer 9, a RGB coloration film 4, and a black matrix 5 between two transparent substrates 1; polarizers 2 installed in the outer sides of the two transparent substrates 1; a sealing material 10 disposed in the circumference of the two transparent substrates 1; and a liquid crystal 7 encapsulated in a gap between the two transparent substrates 1 located on opposite sides of the sealing material 10. In this liquid crystal display, spacers 8 are used for the purpose of regulating the gap between the two transparent substrates 1 and retaining a proper thickness (cell gap) of a liquid crystal layer.

In a conventional method of fabricating the liquid crystal display, since the spacers are randomly and evenly ejected to a substrate bearing pixel electrodes thereon, the spacers are sometimes disposed even on the pixel electrodes, which are display parts. The spacers are generally made of a synthetic resin, glass or the like and if the spaces are located on the pixel electrodes, due to the depolarization function, light leakage takes place in the parts where the spacers are located. Further, light omission occurs owing to disorder of the alignment of the liquid crystal on the spacer surface to deteriorate the contrast and the color tone and worsen the display image quality. Further, with respect to a TFT liquid crystal display, when the spacers are disposed on TFT elements, there occurs a serious problem that the elements are broken when pressure is applied to the substrate.

To solve such a problem caused in the case of random spray of the spacers, it is proposed that the spacers are located only in light shielding regions, non-display parts. As a method of locating the spacers only on specified positions, for example, Japanese Kokai Publication Hei-4-198919 discloses a method of locating the spacers only on the positions corresponding to the aperture parts after aperture parts of a mask and the positions to locate the spaces thereon are conformed to each other, using a mask having aperture parts, and Japanese Kokai Publication Hei-6-258647 discloses a method of electrostatically attracting the spacers to a photoconductor and then transferring the spacers to a transparent substrate. However, in these methods, since the mask or a photoconductor was directly brought into contact with the substrate, there occurred a problem that the alignment layer on a substrate were damaged and deterioration of the image quality of the liquid crystal display was caused.

On the other hand, Japanese Kokai Publication Hei-10-339878 discloses a method of locating resin spacers on specified positions due to electrostatic repulsion by applying electric potential to pixel electrodes on a substrate and ejecting the charged resin spacers. However, in this method, since electrodes in the pattern of desired location were required, it was impossible to locate the spacers on completely optional positions and it was sometimes impossible to employ the method for fabrication of specified liquid crystal displays.

Japanese Kokai Publication Sho-57-58124 discloses a method of locating spacers on a substrate by an ink-jet method of ejecting droplets of spacer dispersion liquid from nozzles of an ink-jet apparatus to the substrate and depositing them on the substrate. It may be said that this method is advantageous in a point that the spacers in an optional pattern can be located on optional positions, without bringing the mask or the like into contact with the substrate like the methods.

However, in a conventional ink-jet method, if the interval of deposition of the droplets of the spacer dispersion liquid was narrowed so as to improve the resolution (narrow the arrangement intervals of the spacers) of the liquid crystal display, the droplets of the spacer dispersion liquid were touched together on the substrate, and on the other hand, if the quantity of each droplet of the spacer dispersion liquid was decreased by making the hole diameter of the nozzles of an ink-jet head small so as to prevent being touched together of the droplets of the spacer dispersion liquid on the substrate, the precision of the deposition positions of the droplets of the spacer dispersion liquid was lowered and the resolution of the liquid crystal display could not be improved.

SUMMARY OF THE INVENTION

In view of the state of the art, it is an object of the invention to provide a method of fabricating a liquid crystal display by which a liquid crystal display capable of displaying a high quality display image with high resolution and preventing light leakage, light omission and the like due to spacers may be produced.

The present invention provides a method of fabricating a liquid crystal display, which has a step of locating a spacer on a substrate by ejecting a droplet of spacer dispersion liquid containing a spacer with a particle diameter R (μm) from a nozzle of an ink-jet apparatus and depositing the droplet on the substrate surface, a hole diameter of the nozzle being 7R (μm) or larger, the spacer dispersion liquid having surface tension of 30 to 50 mN/m and a contact angle θ on the substrate surface of 30 to 90° and, in the step of locating the spacer on the substrate, depositing the droplet of the spacer dispersion liquid on the substrate surface at the interval of deposition D (μm) satisfying a relationship of the following formula (1):

$$D \geq 35 \times \left[ \frac{R}{2 - 3\cos\theta + \cos^3\theta} \right]^{1/3}. \quad (1)$$

In the present invention, it is preferable to locate a spacer on a lattice point of a lattice light shielding region of a substrate A bearing a color filter having a pixel region located following a certain pattern and the lattice light shielding region defining the pixel region, or on a position of a substrate B to be set on the opposite side of the substrate A with a spacer and a liquid crystal interposed, corresponding to the lattice point of the lattice light shielding region of the substrate A.

Figure 1:
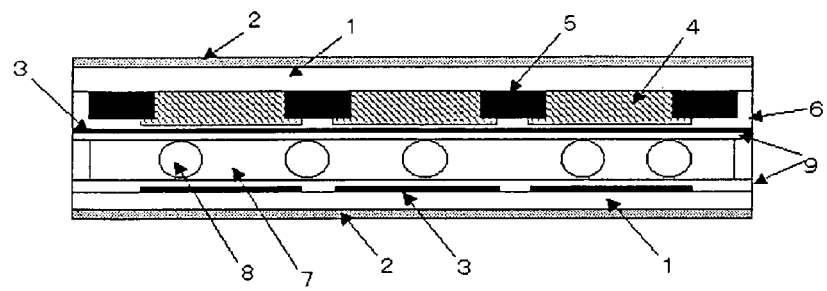
FIG. 1 is a schematic view showing the structure of a conventional liquid crystal display.

In the drawings, the reference numeral 1 represents a transparent substrate; 2 represents a polarizer; 3 represents a transparent electrode; 4 represents a RGB coloration film; 5 represents a black matrix; 6 represents an overcoat; 7 represents a liquid crystal; 8 represents a spacer; 9 represents an alignment layer; 10 represents meniscus; and 11 represents spacer dispersion liquid.

DETAILED DESCRIPTION OF THE INVENTION

Hereinafter, the invention will be described in detail.

A method of fabricating a liquid crystal display of the present invention has a step of locating spacers on a substrate by ejecting droplets of spacer dispersion liquid containing the spacer with a particle diameter R ($\mu$m) from nozzles of an ink-jet apparatus and depositing the spacers on the substrate surface.

The ink-jet apparatus is not particularly limited and ink-jet apparatus employing a piezoelectric manner of ejecting liquid by vibration of a piezoelectric element and a thermal manner of ejecting liquid by utilizing the expansion of the liquid by acute heating. In the piezoelectric manner, the liquid is drawn into an ink chamber in vicinity of the piezoelectric element or ejected via nozzle tip ends from the ink chamber by vibration of the piezoelectric element.

Generally, a plurality of nozzles are installed in the direction perpendicular to the movement direction of the ink-jet head in a certain location manner such as equal intervals in the ink-jet apparatus.

The hole diameter of each nozzle of the ink-jet apparatus is 7R ($\mu$m) or larger in relation to the particle diameter R ($\mu$m) of the spacers. If it is smaller than 7R ($\mu$m), as compared with the particle diameter of the spacers, the hole diameter of the nozzles is so small that the ejecting precision may be decreased at the time of ejecting the spacers or in an extreme case, the nozzles are clogged to make ejection impossible. Since the particle diameter of the spacers is generally about 1.5 to 10 $\mu$m, the aperture diameter of the nozzles of the ink-jet apparatus is set to be at least 10 $\mu$m or larger.

The reason for decrease of the ejection precision at the time of ejecting the spacers if the hole diameter of the nozzles is so small in relation to the particle diameter can be explained as follows.

Figure 2:
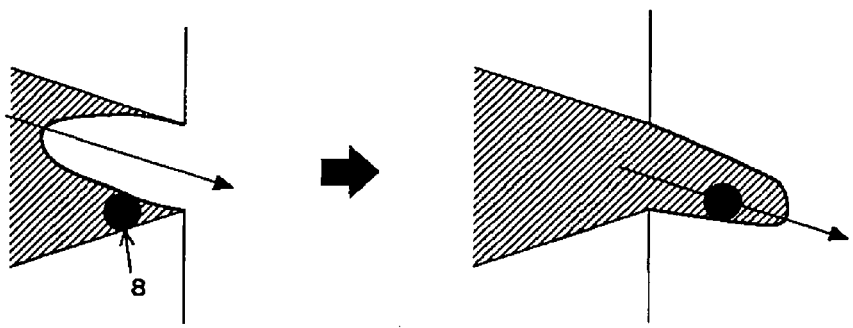
FIGS. 2a and b are schematic views showing the ejecting state of droplets of spacer dispersion liquid.
Figure 2:
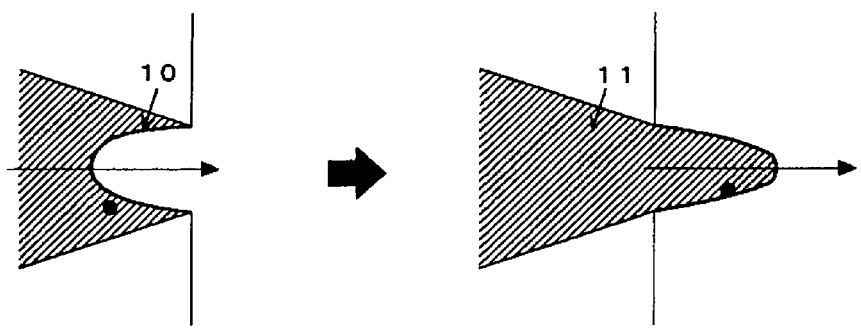

As an ejecting method of droplets in the ink-jet apparatus, there are a drawing method by which the meniscus (the interface between an ink and air) at the nozzle tip ends is drawn back immediately before ejection and then the liquid is pushed out and a pushing method by which the liquid is directly pushed out from the position where the meniscus is set still and stopped. The drawing method is mainly employed in common ink-jet apparatus and the drawing method can be characterized in that it can eject small droplets. Since it is required to eject small droplets in the case of ejecting droplets of the spacer dispersion liquid, the drawing method is effective. In the drawing method, the meniscus is drawn back immediately before ejection, however, as shown in FIG. 2(a), in the case the hole diameter of the nozzles is small and if the spacers exist in the vicinity of the drawn back meniscus, the meniscus is not drawn back axially symmetrically and therefore the droplets do not move straight forward but curved at the time of pushing after the drawing back, and ejection precision decreases. On the other hand, as shown in FIG. 2(b), in the case the hole diameter of the nozzles is large, the meniscus is drawn back axially symmetrically and the droplets move straight forward at the time of pushing after the drawing back.

The hole diameter of the nozzles of the ink-jet apparatus is preferably 15R ($\mu$m) and 150 $\mu$m or smaller. If it more than 15R ($\mu$m) and 150 $\mu$m, the droplets to be ejected become large to make the deposition diameter large and therefore the precision of the spacer location may decrease.

The quantity of the droplets to be ejected by the nozzles of the ink-jet apparatus is preferably 10 to 80 pL. As a method of controlling the quantity of the droplets, a method of optimizing the hole diameter of the nozzles, a method of optimizing the electric signals for controlling the ink-jet head, and the like may be exemplified. Above all, the method of optimizing the electric signals for controlling the ink-jet head is particularly important in the piezoelectric manner ink-jet apparatus.

The spacer dispersion liquid contains spacers with a particle diameter R ($\mu$m).

The spacer is preferable to be dispersed in single particle state in the spacer dispersion liquid. If there are agglomerates in the spacer dispersion liquid, the ejection precision of the ink-jet apparatus may decrease and in an extreme case, the nozzles of the ink-jet apparatus may be clogged.

The spacers are not particularly limited and inorganic silica fine particles, organic polymer fine particles, and the like can be exemplified. Among them, the organic polymer fine particles have proper hardness so as not to damage an alignment layer formed on a substrate of a liquid crystal display, are easy to follow the fluctuation of the thickness owing to the thermal expansion or thermal shrinkage and spacers move drelatively scarcely inside the liquid crystal display and therefore, they are preferable.

The organic polymer fine particles are not particularly limited and in general, in terms of strength and the like, polymers obtained by polymerization of mixtures of monofunctional monomers and polyfunctional monomers may be used. The mixing ratio of the polyfunctional monomers in the mixtures is preferably 30% by weight or lower.

The monofunctional monomers are not particularly limited and examples include styrene derivatives such as styrene, $\alpha$-methylstyrene, p-methylstyrene, p-chlorostyrene, and chloromethylstyrene; vinyl chloride; vinyl esters such as vinyl acetate and vinyl propionate; unsaturated nitriles such as acrylonitrile; and (meth)acrylic ester derivatives such as methyl (meth)acrylate, ethyl(meth)acrylate, butyl (meth) acrylate, 2-ethylhexyl (meth)acrylate, stearyl (meth)acrylate, ethylene glycol (meth)acrylate, trifluoroethyl (meth) acrylate, pentafluoropropyl (meth)acrylate, and cyclohexyl (meth)acrylate. These monofunctional monomers may be used alone or two or more of them may be used in combination.

The polyfunctional monomers are not particularly limited and examples include divinylbenzene, 1,6-hexanediol di(meth)acrylate, trimethylolpropane tri(meth)acrylate, tetramethylolmethane tri(meth)acrylate, tetramethylolpropane tetra(meth)acrylate, diallyl phthalate and its isomers, triallyl isocyanurate and its derivatives, trimethylolpropane tri (meth)acrylate and its derivatives, pentaerythritol tri(meth) acrylate, pentaerythritol tetra(meth)acrylate, dipentaerythritol hexa(meth)acrylate, polyethylene glycol di(meth) acrylate such as ethylene glycol di(meth)acrylate, polypropylene glycol di(meth)acrylate such as propylene glycol di(meth)acrylate, polytetramethylene glycol di(meth) acrylate, neopentyl glycol di(meth)acrylate, 1,3-butylene glycol di(meth)acrylate, 2,2-bis[4-(methacryloxypolyethoxy)phenyl]propane di(meth)acrylate such as 2,2-bis[4-(methacryloxyethoxy)phenyl]propane di(meth)acrylate, 2,2-hydrogenated-bis[4-(acryloxyethoxy)phenyl]propane di(meth)acrylate, and 2,2-bis[4-(acryloxyethoxypolypropoxy)phenyl]propane di(meth)acrylate. These polyfunctional monomers may be used alone or two or more of them may be used in combination.

A method of producing fine particles by polymerization of the mixtures of the monofunctional monomers and polyfunctional monomers is not particularly limited and examples are suspension polymerization, seed polymerization, dispersion polymerization and the like.

The suspension polymerization is a method of polymerization to adjust the intended particle diameter by dispersing a monomer composition containing monomers and a polymerization initiator in a poor solvent. In the suspension polymerization, generally water mixed with a dispersion stabilizer may be used as a dispersion medium.

Although differing depending on the polymerization initiator and monomers, the polymerization conditions in the suspension polymerization are preferably 50 to 80° C. for polymerization temperature and 3 to 24 hours for polymerization time.

In the case of the suspension polymerization, the particle diameter distribution of the fine particles to be obtained becomes relatively broad and therefore classification is carried out at the time of using the particles as spacers. Accordingly, the suspension polymerization is suitable for producing fine particles with various particle diameters.

The seed polymerization is a polymerization method of expanding particles to an intended diameter by making monodisperse seed particles which are synthesized by soap-free polymerization or emulsion polymerization further absorbing monomers and then carrying out polymerization.

The organic monomers to be used as the seed particles are not particularly limited, however, to suppress the phase separation at the time of the seed polymerization, it is preferable for the organic monomers to have a composition as similar as possible to that of the monomers to be absorbed at the time of seed polymerization and in terms of the monodispersibility of the particle diameter distribution, styrene and its derivatives are preferably used.

The particle diameter distribution of the seed particles is reflected in the particle diameter distribution after seed polymerization and therefore, it is preferable to be monodisperse as much as possible and to have CV value of 5% or lower.

The monomers to be absorbed at the time of the seed polymerization are not particularly limited, however, since the phase separation from the seed particles easily occurs at the time of seed polymerization, it is preferable for the monomers to have a composition as similar as possible to that of the seed particles. For example, if the seed particles are of styrene, it is preferable to use aromatic divinyl monomers and if the seed particles are of acrylic, it is preferable to use acrylic multi-vinyl monomers.

The addition amount of the monomers to be absorbed in the seed particles in the seed polymerization is preferably 20 to 100 parts by weight to 1 part by weight of the seed particles. If it is less than 20 parts by weight, the breaking strength of crosslinked particles to be obtained is sometimes insufficient and if it is more than 100 part by weight, the particle agglomeration or the like takes place at the time of seed polymerization to result in board particle diameter distribution in some cases.

Since monodisperse particles can be obtained without classification in the seed polymerization, the seed polymerization is preferable for producing a large quantity of fine particles with a specified particle diameter.

The dispersion polymerization is a method of precipitating produced polymers in form of particles by carrying out polymerization in a poor solvent system in which the monomers are dissolved but produced polymers are not dissolved after previously adding a polymer dispersion stabilizer to the system. Generally, if crosslinkable monomers are polymerized by dispersion polymerization, particles tend to agglomerate and thus it becomes difficult to stably obtain monodisperse crosslinked particles, however, it is made possible by selecting the conditions.

It is preferable to control the crosslinkable monomers in 50% by weight or more in the entire amount of the monomers. If it is less than 50% by weight, since having soft surfaces in the solvent at the time of polymerization, the fine particles to be formed by the dispersion polymerization are touched together one another owing to collision of the fine particles, particle diameter distribution may broad and further agglomerates may be formed. Further, even if the monodispersibility is maintained, in the case the crosslinking density is low, sufficient breaking strength as spacers may not be obtained.

Since the dispersion polymerization can produce monodisperse particles without classification and therefore, it is suitable for producing a large quantity of fine particles with a specified particle diameter.

In the case of the various polymerization methods, a polymerization initiator, a solvent, a dispersion stabilizer and the like are employed.

The polymerization initiator is not particularly limited and examples include organic peroxides such as benzoyl peroxide, lauroyl peroxide, ortho-chlorobenzoyl peroxide, ortho-methoxybenzoyl peroxide, 3,5,5-trimethylhexanoyl peroxide, t-butylperoxy-2-ethyl hexanoate, and di-t-butyl peroxide; and azo compounds such as azobis(isobutylonitrile), azobis(cyclohexacarbonitrile), and azobis(2,4-dimethylvaleronitrile).

In general, the addition amount of the polymerization initiator is preferably 0.1 to 10 parts by weight to 100 parts by weight of the mixture of monofunctional monomers and polyfunctional monomers.

The solvent may properly be selected depending on the monomers to be used and examples preferably include organic solvents such as acetonitrile, N,N-dimethylformamide, dimethylsulfoxide, ethyl acetate; alcohols such as methanol, ethanol, and propanol; Cellosolves such as methyl cellosolve and ethyl cellosolve; ketones such as acetone, methyl ethyl ketone, methyl butyl ketone, and 2-butanone; and hydrocarbons. Also, the solvent may include mixed solvents of these organic solvents with other organic solvents compatible with the formers and water and the like.

The dispersion stabilizer is preferably a polymer soluble in a medium and examples include polyvinyl alcohol, polyvinylpyrrolidone, methyl cellulose, ethyl cellulose, poly(acrylic acid), polyacrylamide, and poly(ethylene oxide). Also, nonionic or ionic surfactants are used accordingly.

The spacers are required to have a certain strength since they are used as the gap material of the liquid crystal display and the compressive elasticity modulus with 10% deformation of the diameter (hereinafter, referred to also as 10% K-value) is preferably 2,000 to 15,000 MPa. If it is less than 2,000 MPa, deformation occurs due to the press pressure at the time of assembly of the liquid crystal display, and thus it sometimes becomes impossible to keep a proper gap. If it is more than 15,000 MPa, the alignment layer on the substrate may be damaged at the time of disposition in the liquid crystal display abnormal display may be caused.

The 10% K-value can be calculated from load to cause 10% strain of fine particles on a smooth end face of a column made of diamond with 50 μm diameter by using a micro compressing tester (PCT-200, manufactured by Shimadzu Corporation) according to the method disclosed in Japanese Kohyo Publication Hei-6-503180.

The spacers may be used being colored for improving the contrast of the liquid crystal display. As the colored spacers, for example, those which are colored by treatment with carbon black, disperse dyes, acidic dyes, basic dyes, metal oxides, or by coating organic films on the surfaces and decomposing or carbonizing the resulting film at a high temperature may be used. In the case the materials themselves to form the spacers have colors, they may be used as they are without coloration.

The spacers may be coated with adhesive layers on the surfaces or surface-modified so as not to disorder the alignment of the liquid crystal.

As a method of the surface-modification, there are a method, as disclosed in Japanese Kokai Publication Hei-1-247154, of modification by depositing resin on the spacer surfaces; a method, as disclosed in Japanese Kokai Publication Hei-9-113915, of modification by applying compounds reactive on functional groups of the spacer surfaces; and a method, as disclosed in Japanese Kokai Publication Hei-11-223821, of modification by graft-polymerization on the spacer surfaces. The method for forming a surface layer chemically bonded to the spacer surfaces is preferable since it can prevent separation of the surface layer in the cell of the liquid crystal display or elution to the liquid crystal. Among them, as disclosed in Japanese Kokai Publication Hei-9-113915, a method involving causing reaction of an oxidizing agent with fine particles having reductive groups in the surface to generate radicals on the particle surface and carrying out graft polymerization on the surface is particularly preferable since the surface layer with a high density and a sufficient thickness can be formed.

The concentration of the spacers in the spacer dispersion liquid is preferably 0.05 to 5% by weight. If it is less than 0.05% by weight, the probability that no spacer is contained in a droplet of the ejected spacer dispersion liquid may be high. If it is more than 5% by weight, the nozzles of the ink-jet apparatus tend to be clogged easily or the number of spacers contained in each droplet of the deposited spacer dispersion liquid may possibly be too high to move the spacers in the drying step. It is more preferably 0.1 to 2% by weigh.

The spacer dispersion liquid is dispersion liquid obtained by dispersing spacers in a medium.

The medium of the spacer dispersion is not particularly limited and various compounds in liquid at a temperature to be ejected by the ink-jet head may be used. Above all, water-soluble or hydrophilic liquid is preferable. Since ink-jet heads of some ink-jet apparatuses are made usable for water systems, in the case of using such ink-jet heads, media with high hydrophobicity are not preferable since they may erode members composing the ink-jet heads or dissolve a part of adhesives sticking the members. Further, in general, since a resin thin film called as an alignment layer is formed on the substrate, those which do not cause the alignment layer pollution, for example, do not penetrate or dissolve the alignment layer, are preferable.

The water-soluble or hydrophilic liquids are not particularly limited and examples include pure water; monoalcohols such as ethanol, n-propanol, 2-propanol, 1-butanol, 2-butanol, 1-hexanol, 1-methoxy-2-propanol, furfuryl alcohol, and tetrahydrofurfuryl alcohol; oligomers such as ethylene glycol, diethylene glycol, triethylene glycol, and tetraethylene glycol; lower monoalkyl ethers such as monomethyl ether, monoethyl ether, monoisopropyl ether, monopropyl ether, and monobutyl ether of ethylene glycol oligomers; lower dialkyl ethers such as dimethyl ether, diethyl ether, diisopropyl ether, and dipropyl ether of ethylene glycol oligomers; alkyl esters such as monoacetate and diacetate of ethylene glycol oligomers; oligomers of propylene glycol such as propylene glycol, dipropylene glycol, tripropylene glycol, and tetrapropylene glycol; lower monoalkyl ethers such as monomethyl ether, monoethyl ether, monoisopropyl ether, monopropyl ether, and monobutyl ether of propylene glycol oligomers; lower dialkyl ethers such as dimethyl ether, diethyl ether, diisopropyl ether, and dipropyl ether of propylene glycol oligomers; alkyl esters of monoacetate and diacetate of propylene glycol oligomers; diols such as 1,3-propanediol, 1,2-butanediol, 1,3-butanediol, 1,4-butanediol, 3-methyl-1,5-pentanediol, 3-hexene-2,5-diol, 1,5-pentanediol, 2,4-pentanediol, 2-methyl-2,4-pentanediol, 2,5-hexanediol, 1,6-hexanediol, and neopentyl glycol; ether derivatives and acetate derivatives of diols; polyhydric alcohols such as glycerin, 1,2,4-butanetriol, 1,2,6-hexanetriol, 1,2,5-pentanetriol, trimethylolpropane, trimethylolethane, and pentaerythritol; ether derivatives and acetate derivatives of polyhydric alcohols; dimethyl sulfoxide, thiodiglycol, N-methyl-2-pyrrolidone, N-vinyl-2-pyrrolidone, γ-butyrolactone, 1,3-dimethyl-2-imidazolidine, sulfolane, formamide, N,N-dimethylformamide, N,N-diethylformamide, N-methylformamide, acetamide, N-methylacetamide, α-terpineol, ethylene carbonate, propylene carbonate, bis-β-hydroxyethylsulfone, bis-β-hydroxyethylurea, N,N-diethylethanolamine, abietinol, diacetone alcohol, and urea.

The medium of the spacer dispersion liquid is preferable to contain liquid with a boiling point lower than 100° C. More preferably, an organic solvent with a boiling point of 70° C. or higher and lower than 100° C. is used. As such an organic solvent, for example, lower monoalcohols such as ethanol, n-propanol, and 2-propanol and acetone can be exemplified. Use of these organic solvents with relatively low boiling points makes evaporation of them possible at a relatively low temperature in the case of drying the spacer dispersion liquid ejected to the substrate, and it can prevent pollution of the alignment layer due to contact with a high temperature medium and deterioration of the display quality of the liquid crystal display.

The liquid with a boiling point lower than 100° C. is preferable to have a surface tension of 25 mN/m or lower at 20° C. If the surface tension of the liquid to be ejected is 30 to 50 mN/m, a common ink-jet apparatus shows good ejection precision. On the other hand, the surface tension of the spacer dispersion liquid ejected to the substrate is desirable to be high for transferring the spacers during the drying step. If the surface tension of the liquid with a boiling point lower than 100° C. is 25 mN/m or lower at 20° C., the surface tension of the spacer dispersion liquid can be kept relatively low at the time of ejecting and a good ejection precision can be obtained and after the deposition on the substrate, the liquid can be evaporated prior to other components in the spacer dispersion liquid the surface tension of the resulting spacer dispersion liquid increases and thus transfer of the spacers toward the deposited point centers is made easy.

The ratio of the liquid with a boiling point lower than 100° C. in the medium is preferably 10 to 80% by weight. If it is lower than 10% by weight, the drying speed of the spacer dispersion liquid at the relatively low drying temperature becomes low and the productivity may decrease. If it is more than 80% by weight, the spacer dispersion liquid is excessively dried in the vicinity of the nozzles of the ink-jet apparatus and the ejection precision may decrease or agglomerated particles may be formed due to drying of the spacer dispersion liquid at the time of production or storage. In this specification, the boiling point means the boiling point at one atmospheric pressure.

The medium of the spacer dispersion liquid is preferable to contain a liquid with a boiling point of 150° C. or higher. More preferably, a solvent having a boiling point of 150° C. or higher and 200° C. or lower is contained. As such a solvent, ethylene glycol and lower alcohol ethers such as ethylene glycol monomethyl ether and ethylene glycol dimethyl ether can be exemplified. Use of such a solvent prevents decrease of the ejection precision owing to the excess drying in the vicinity of the nozzles of the ink-jet apparatus or suppresses formation of the agglomerated particles because of drying of the spacer dispersion liquid at the time of production or storage.

The liquid with a boiling point of 150° C. or higher is preferable o have surface tension of 30 mN/m or higher at 20° C. If it is 30 mN/m or higher, it is made possible to keep the surface tension of the spacer dispersion liquid high and make the movement of the spacers easy after the droplets of the spacer dispersion liquid are deposited on the substrate and the solvent component with a lower boiling point is evaporated.

The ratio of the liquid having a boiling point of 150° C. or higher in the medium is preferably 10 to 80% by weight. If it is lower than 10% by weight, the ejection precision can be decreased owing to drying of the spacer dispersion liquid and agglomerated particles tend to be formed easily. If it is more than 80% by weight, it takes a long time to dry it and the efficiency decreases and also the quality of the display image of the liquid crystal display tends to be deteriorated owing to the pollution of the alignment layer.

The spacer dispersion liquid may further contain an adhesive component for providing adhesive property and various surfactants and viscosity adjustment agents for improving the dispersibility of the spacers or improving the ejection precision by control of the physical properties such as surface tension and viscosity or improving the mobility of the spacers.

The surface tension of the spacer dispersion liquid is 30 to 50 mN/m. If it is lower than 30 mN/m, the contact angle of the spacer dispersion liquid and the substrate surface can not be high and even if a substrate having an alignment layer with high hydrophobicity and low surface tension is used, the droplets of the spacer dispersion liquid are spread on the substrate and the location intervals of the spacers cannot be narrow. If it is more than 50 mN/m, bubbles remain in the nozzles of the ink-jet head to make ejection impossible. The surface tension of the spacer dispersion liquid can be adjusted by addition of the medium of the spacer dispersion liquid.

The surface tension of the spacer dispersion liquid can be measured at an ink-jet head temperature of the ink-jet apparatus at the time of ejection, which is optionally set in a range from −5° C. to 50° C.

The contact angle $\theta$ of the spacer dispersion liquid to the substrate surface is 30 to 90°. If it is less than 30°, the droplets of the spacer dispersion liquid ejected to the substrate surface are spread on the substrate and the location intervals of the spacers cannot be narrow. If it is more than 90°, the droplets of the spacer dispersion liquid ejected to the substrate surface move around on the substrate by a slight vibration and as a result, the location precision decreases or adhesion of the spacers to the substrate worsens. The contact angle $\theta$ of the spacer dispersion liquid to the substrate surface can be controlled by adjusting the surface tension of the spacer dispersion liquid by addition of the medium of the spacer dispersion liquid.

The contact angle $\theta$ of the spacer dispersion liquid to the substrate surface can be measured at the substrate surface temperature at the time of deposition of the droplets of the spacer dispersion on the substrate surface.

The viscosity of the spacer dispersion liquid is preferably 0.5 to 15 mPa·s. If it is less than 0.5 mPa·s, it may become impossible to stably ejecting them, that is, it may become difficult to control the ejection quantity. If it is more than 15 mPa·s, it may become impossible to eject them by the ink-jet apparatus. It is more preferably 5 to 10 mPa·s. In addition, the liquid temperature of the spacer dispersion liquid may be adjusted at the time of ejection by controlling the temperature of the ink-jet head of the ink-jet apparatus in a range from −5° C. to 50° C. so as to keep the viscosity in the preferable range.

With respect to the method of fabricating a liquid crystal display of the present invention, in the step of locating the spacers on the substrate, the droplets of the spacer dispersion liquid are deposited on the substrate surface at the interval of deposition D (μm) satisfying the relationship of the following formula (1):

$$D \geq 35 \times \left[ \frac{R}{2 - 3\cos\theta + \cos^3\theta} \right]^{1/3}. \quad (1)$$

In the case the ejection is carried out with the narrow interval of deposition without satisfying the relationship of the formula (1), unless the hole diameter of the nozzles of the ink-jet head is made small, the diameter of droplets of the spacer dispersion liquid to be ejected becomes wide and the deposition diameter is also wide, so that the droplets are touched together one another on the substrate and if it occurs, the spacers cannot move toward certain points during the drying step and consequently, the location precision of the spacers after the drying is decreased. On the other hand, if the hole diameter of the nozzles of the ink-jet head is narrowed so as to make the diameter of the droplets of the spacer dispersion liquid to be ejected small, the spacer particle diameter becomes large relatively to the hole diameter of the nozzles and consequently, the spacers cannot stably be ejected linearly in a single direction and owing to flying curve, the precision of the deposition positions is decreased and in a worse case, nozzles may be clogged with the spacers.

The droplets of the spacer dispersion liquid are preferable to be deposited on the surface of one of two substrates composing the liquid crystal display.

The substrate is not particularly limited and, for example, those which comprise glass or resin and are commonly used as panel substrates for the liquid crystal display can be used. A resin thin film called alignment layer for controlling the alignment of the liquid crystal molecules is generally formed on the surface of the substrate. The alignment layer is not particularly limited and generally, polyamide resin may be used to control the alignment of the liquid crystal molecules by rubbing treatment of the surface. As described, the contact angle θ of the spacer dispersion liquid on the substrate surface to which the droplets of the spacer dispersion liquid are deposited is 30 to 90°.

Either one of substrates is preferable to bear a color filter having pixel regions located following specified patterns and lattice light shielding regions defining the pixel regions.

The location positions of the spacers on the substrate are not particularly limited and may be located randomly or being patterned in specified positions, however, to prevent deterioration of display image quality of the liquid crystal display of the light omission and the like due to the spacers, it is preferable to locate them in non-display parts. As the non-display parts, there are light shielding regions, called black matrix, formed in the surroundings of the pixel regions and further parts positions where TFT elements are formed in the case of the TFT liquid crystal display and they are preferable to be located under the black matrix so as not to break the TFT elements.

The spacers may be located in any optional patterns in any parts under the light shielding regions, however, to prevent them from coming out to the display parts, they are preferable to be located either on positions of lattice points of lattice light shielding regions of the substrate A bearing a color filter having pixel regions located following a certain pattern and the lattice light shielding regions defining the pixel regions, or on positions of the substrate B to be set on the opposite side of the substrate A with the spacers and a liquid crystal interposed, corresponding to the lattice point of the lattice light shielding regions of the substrate A.

In addition, the black matrix generally has a width of 10 to 30 μm.

The location density of the spacers is preferably 50 to 350 per 1 mm square.

The interval of deposition 1, which is an interval between the position on the substrate surface where the front end of a droplet of the spacer dispersion liquid is deposited and the position where the rear end of the droplet is deposited, is preferable to be controlled to be wider than 40 μm. In addition, if an ejected droplet is deposited, being divided into several droplets, the interval of deposition 1 means the interval between the droplet which is deposited at first and the droplet which is deposited remotest form the first deposited droplet.

Control of the interval of deposition 1 to be wider than 40 μm makes each droplet be elliptical or divides each droplet into several small droplets even in the case of circular droplet, while each droplet of the spacer dispersion liquid is made one circular droplet at the time of deposition by a conventional ejection method of the spacer dispersion liquid. Accordingly, in comparison with the deposition diameter obtained by the conventional ejection method of the spacer dispersion liquid, the shorter diameter of the elliptical droplets or the maximum deposition diameter among the droplets divided into several small droplets after the deposition can be made small to make the spacers easy to be collected in the non-display parts.

The deposition state is determined by flying state of the droplets jetted out of the nozzles installed in an ink-jet head and the relative speed of the substrate and the ink-jet head. That is, the spacer dispersion liquid ejected in the ink-jet manner is ejected in form of rod droplets out of the nozzles and the droplets of the spacer dispersion liquid are deposited on the substrate as they are without being divided in air or deposited on the substrate while being divided each into two or more droplets in air (generally the latter case is frequent). At that time, if the relative speed $V_1$ of the substrate and the ink-jet head is extremely small, being independent of the flying state, the droplets are deposited in the vicinity of a single point and therefore the droplets are deposited almost circularly. If the relative speed $V_1$ of the substrate and the ink-jet head is small, being independent of the flying state, the droplets are deposited in elliptical shape. If the relative speed $V_1$ of the substrate and the ink-jet head is high, the droplets are deposited in elliptical shape in the case the droplets are not divided in air and droplets divided small are deposited in circular or elliptical shape in the case they are divided in air.

The interval of deposition 1 can be calculated according to the relationship of the following formula (2).

$$l = V_1 t + \frac{LV_1}{\sin\phi} \cdot \frac{V_2 - V_3}{V_2 V_3}. \qquad (2)$$

In the formula (2), $V_1$ represents the relative speed of the ink-jet head and the substrate; t (s) represents the time taken to finish ejection of the rear end from the ejection of the front end of a droplet of the spacer dispersion liquid out of the droplet ejection port of the ink-jet head; L (m) represents the distance between the droplet ejection port of the ink-jet head and the substrate; φ (°) represents the angle between the ejection direction of the droplet of the spacer dispersion liquid and the substrate surface; $V_2$ (m/s) represents the speed of the droplet front end of the spacer dispersion liquid; and $V_3$ (m/s) represents the speed of the droplet rear end of the spacer dispersion liquid.

According to the formula (2), to make the interval of deposition 1 wide, the relative speed $V_1$ of the ink-jet head and the substrate, the ejection time t, and the distance L between the droplet ejection port of the ink-jet head and the substrate are made large, or the speed $V_2$ of the droplet front end of the spacer dispersion liquid and the speed $V_3$ of the droplet rear end of the spacer dispersion liquid are controlled to be slow and the speed $V_3$ of the droplet rear end of the spacer dispersion is controlled to be slow relatively to the speed $V_2$ of the droplet front end of the spacer dispersion liquid, or the angle φ between the ejection direction of the droplet of the spacer dispersion liquid to the substrate surface is made close to horizontal to make sinφ low.

The interval of deposition 1 can be made larger than 40 μm by adjusting the driving conditions of the ink-jet head (piezoelectric element or the like) so as to control the respective parameters of the formula (2) for ejecting the droplets of the spacer dispersion liquid.

Then, the respective parameters of the formula (2) will be explained.

At first, the ink-jet head (nozzle) is installed at a tilt while the distance L between the droplet ejection port of the ink-jet head (nozzle tip end) and the substrate and the angle φ between the substrate surface and the ejection direction of the droplet of the spacer dispersion liquid being controlled properly. The spacer dispersion liquid is ejected out of the nozzle to the substrate moving at a relative speed $V_1$ in relation to the ink-jet head at the droplet front end speed $V_2$ in a manner that the ejection of the droplet rear end is finished after a lapse of the time t. At that time, the speed of the droplet rear end of the spacer dispersion liquid is $V_2$.

Ejection in such a manner is defined to be one cycle and this cycle is repeated to locate the droplets of the spacer dispersion liquid on the substrate.

The upper limit of the relative speed $V_1$ of the ink-jet head and the substrate is determined by the ability of a driving apparatus such as the acceleration precision and positioning precision of the driving apparatus and so far, it is about 100 m/s. In the case the interval of distribution of the spacer dispersion liquid (the time of one cycle) is too short to locate the spacers at desired intervals attributed to that the relative speed $V_1$ of the ink-jet head and the substrate is increased, the spacer dispersion liquid may be deposited in a plurality of times or the number of nozzles may be increased so as to solve such a problem. A method of depositing the spacers in a plurality of times is not particularly limited and they may be ejected changing the movement direction alternately every time (reciprocating ejection) or ejected only at the time of movement in one direction (one way ejection).

The ejection time t may be set generally to be 3 µs to 1 ms depending on the control conditions of the voltage to be applied to the piezoelectric element. The control condition of the voltage (waveform) to be applied to the piezoelectric element is set so as to stably eject the spacer dispersion liquid depending on the surface tension and the viscosity of the spacer dispersion liquid.

The distance L between the droplet ejection port of the ink-jet head and the substrate is preferably 200 µm to 3 mm. If it is less than 200 µm, the ink-jet head may be brought into contact with the substrate and damage the substrate or the ink-jet head may be broken owing to the unexpected vibration. If it is more than 3 mm, since the droplet of the spacer dispersion liquid is so small as to be affected easily with air current in the ambient atmosphere or the slight curve of the droplet is magnified and a problem that the spacers are deposited at positions shifted from expected deposition positions and the like may occur. It is more preferably 300 µm to 1.5 mm.

The angle ϕ between the ejection direction of a droplet of the spacer dispersion liquid and the substrate surface is preferably 5 to 175°. If it is less than 5° or more than 175°, the duration the droplet stays in air to the deposition time is prolonged and similarly to the case that the distance L between the droplet ejection port of the ink-jet head and the substrate is wide, the droplet of the spacer dispersion liquid may be so small as to be affected easily with air current in the ambient atmosphere or the slight curve of the droplet is magnified and a problem that the spacers are deposited at positions shifted from expected deposition positions may occur.

The speed $V_2$ of the front end of the droplet of the spacer dispersion liquid can be controlled generally in a range of 3 to 20 m/s by increasing or decreasing the voltage to be applied to the piezoelectric element in the case of a piezoelectric ink-jet apparatus. The speed $V_2$ of the front end of the droplet of the spacer dispersion liquid is preferably 5 to 12 m/s.

The speed $V_3$ of the rear end of the droplet of the spacer dispersion liquid is lower than the speed $V_2$ of the front end of the droplet of the spacer dispersion liquid and generally in a range of 1 to 10 m/s. The speed $V_3$ of the rear end of the droplet of the spacer dispersion liquid is determined depending on the speed $V_2$ of the front end of the droplet of the spacer dispersion liquid, the divided state of the droplet of the spacer dispersion liquid, and the surface tension and viscosity of the spacer dispersion liquid.

The droplet of the spacer dispersion liquid is ejected in rod state and there are cases that the droplet is not divided and the droplet is divided until it is deposited on the substrate. In the case that no division takes place and the droplet becomes spherical in air until it is deposited, the speed of the front end of the droplet and the speed of the rear end at the time of deposition are approximately the same. To say strictly, the droplet speed at the time of the deposition is not the same as the speed of the front end of the droplet or the speed of the rear end since the droplet in rod shape becomes spherical, however, the difference is small as compared with the droplet speed and therefore in this case, they are regarded to be the same. In the case that no division takes place and the droplet is deposited as it is in rod state, the difference of the speed of the front end of the droplet or the speed of the rear end at the time of ejection is left as the difference of the speed of the front end of the droplet or the speed of the rear end at the time of deposition.

On the other hand, in the case the droplet is divided into several droplets, it is supposed that the speed of the front end of the droplet at the time of ejection is the speed of the droplet at the head at the time of deposition (generally called as a main droplet) and that the speed of the rear end of the droplet at the time of ejection is the speed of the droplet in the most tail (generally the droplet following the main droplet is called as a satellite droplet).

In addition, generally, if the speed of the front end of the droplet is 3 m/s or lower, the droplet is not divided in many cases and if the speed of the front end of the droplet is 3 to 20 m/s, the droplet is divided in many cases.

The spacer dispersion liquid deposited on the substrate surface by the method is dried and the spacers are located on the substrate.

A method of drying the spacer dispersion liquid is not particularly limited and for example, there are a method of heating the substrate and a method of blowing hot air and to gather the spacers around the center of the deposited droplet during the drying step, it is preferable to set proper conditions such as the boiling point of the medium, the drying temperature, the drying time, the surface tension of the medium, the contact angle of the medium on the alignment layer and the concentration of the spacers.

To gather the spacers around the center of the deposited droplet during the drying step, it is preferable to dry for duration to an extent that the liquid is not eliminated during the time the spacers moved on the substrate. Further, if a medium easy to be evaporated at a room temperature is used for the spacer dispersion liquid, agglomerated particles may be produced by drying at the time of production and storage of the spacer dispersion liquid and thus the ink-jet ejecting property may be deteriorated owing to the drying in the vicinity of a nozzle of the ink-jet apparatus. However, when the medium is brought into contact with the alignment layer for a long time at a high temperature, the alignment layer is polluted to deteriorate the display image quality of the liquid crystal display in some cases. Also, even if the substrate temperature is relatively low, in the case the drying duration is considerably long, the productivity of the liquid crystal display is decreased.

In consideration of these conditions, the temperature of the substrate surface at the time of deposition of the droplet of the spacer dispersion liquid in the method of fabricating the liquid crystal display of the present invention is preferable to be a temperature lower by at least 20° C. than the boiling point of a liquid having the lowest boiling point among the liquid contained in the spacer dispersion liquid. If it is higher than the temperature lower by at least 20° C. than the boiling point of the liquid having the lowest boiling point among the liquid contained in the spacer dispersion liquid, the liquid is acutely evaporated to make the movement of the spacers impossible and in an extreme case, owing to the fierce boiling of the liquid, the spacers are moved together with the droplet on the substrate and considerable decrease of the positioning precision of the spacers occurs in some cases.

Further in the case a drying method for drying the medium by gradually increasing the temperature of the substrate after deposition of the droplet of the spacer dispersion liquid on the substrate surface is employed, it is preferable that the temperature of the substrate surface at the time of deposition of the droplet of the spacer dispersion liquid is lower by at least 20° C. than the boiling point of the liquid having the lowest boiling point among the liquid contained in the spacer dispersion and the temperature of the substrate surface is not higher than 90° C. until the drying is completed. It is more preferable that it is not higher than 70° C. If the temperature of the substrate surface at the time of deposition of the droplet of the spacer dispersion liquid is higher than the temperature lower by 20° C. than the boiling point of the liquid having the lowest boiling point among the liquid contained in the spacer dispersion liquid, the liquid is acutely evaporated to make the movement of the spacers impossible and in an extreme case, owing to the fierce boiling of the liquid, the spacers are moved together with the droplet on the substrate and considerable decrease of the positioning precision of the spacers occurs in some cases. In addition, if the temperature of the substrate surface is more than 90° C. until the drying is completed, the alignment layer is polluted to deteriorate the display image quality of the liquid crystal display in some cases.

The completion of drying means at the moment the droplet on the substrate disappears.

By the method of fabricating the liquid crystal display of the present invention, the liquid crystal display can be fabricated according to conventionally known fabrication steps of the liquid crystal display except the step of locating the spacers on the substrate in the manner.

Generally, the substrate on which the spacers are located by the step of the spacer location on the substrate and a substrate to be set on an opposite substrate are heat bonded using a circumferential seal material and the gap between these two substrates is filled with a liquid crystal so that the substrate on which the spacers are located and the opposite substrate are facing each other with the spacers and a liquid crystal interposed to obtain a liquid crystal display.

Accordingly, the method of fabricating the liquid crystal display of the present invention is a method which has a step of locating spacers on a substrate by ejecting droplets of a spacer dispersion liquid containing the spacers with a particle diameter R (μm) from nozzles of an ink-jet apparatus and depositing the droplets on the substrate surface and the hole diameter of the nozzles is 7R (μm) or larger: the spacer dispersion liquid has surface tension of 30 to 50 mN/m and a contact angle θ on the substrate surface of 30 to 90°: and in the step of locating the spacers on the substrate, depositing the droplets of the spacer dispersion liquid on the substrate surface at the interval of deposition D (μm) satisfying the relationship of the formula (1), so that touching together of the droplets of the spacer dispersion liquid on the substrate or the flying curve at the time of the ejection of the droplets from the nozzles can be prevented and precision of the deposition positions of the spacer dispersion liquid can be improved. Accordingly, the spacers can be located at high precision on non-display parts with a narrow width of the substrate of the liquid crystal display by the ink-jet method and light leakage and light omission due to spacers can be prevented and a liquid crystal display capable of displaying a high quality display image with high resolution can be fabricated.

BEST MODE FOR CARRYING OUT THE INVENTION

Hereinafter, the present invention will be described more in detail by way of examples. However, the present invention is not limited to these examples.

EXAMPLE 1

(Production of Fine Particles for Spacers)

After divinylbenzene 15 parts by weight, isooctyl acrylate 5 parts by weight, and benzoyl peroxide 1.3 parts by weight as a polymerization initiator were evenly mixed in a separable flask and then an aqueous solution of 3% poly(vinyl alcohol) (GL-03, manufactured by Kuraray Co., Ltd.) 20 parts by weight and sodium dodecylsulfate 0.5 part by weight were added and stirred well, ion exchanged water 140 parts by weight was added. While this solution being stirred, reaction was carried out for 15 hours at 80° C. in nitrogen current. After the obtained fine particles are washed with hot water and acetone, the particles are subjected to classification and fine particles for spacers were obtained by evaporation of acetone. The average particle diameter of the fine particles of the spacers was 2.5 μm and CV value was 3.0%.

(Surface Treatment of the Spacers)

The obtained fine particles for spacers 5 parts by weight were added to a mixed solution of dimethyl sulfoxide (DMSO) 20 parts by weight, hydroxymethyl methacrylate 2 parts by weight, and N-ethylacrylamide 18 parts by weight and dispersed by a sonicator and evenly stirred. While nitrogen gas being introduced into the reaction system, stirring was carried out continuously at 30° C. for 2 hours. A 0.1 mol/L di-ammonium cerium nitrate solution 10 parts by weight adjusted with 1 N nitric acid solution was added and the reaction was further continued for 5 hours. On completion of the polymerization reaction, the reaction solution was filtered by a 3 μm membrane filter and particles and the reaction solution were separated. The particles were sufficiently washed by ethanol and acetone and vacuum-dried by a vacuum drier to obtain spacers.

(Production of the Spacer Dispersion Liquid)

The obtained spacers 0.50 parts by weight were slowly added to a dispersion medium with the composition described in Table 1, dispersed by sufficiently stirring by a sonicator, and filtered with stainless mesh with 10 μm opening for removing agglomerates to obtain a spacer dispersion liquid A.

TABLE 1

| | | | Spacer dispersion liquid | | | | | | |
|---|---|---|---|---|---|---|---|---|---|
| | | | A | B | C | D | E | RA | RB |
| Addition amount (parts by weight) | solvent | isopropyl alcohol | 20 | 20 | 10 | 25 | 20 | 100 | — |
| | | ethylene glycol | 40 | 40 | 40 | 75 | 40 | — | — |
| | | water | 40 | 40 | 50 | — | 40 | — | 100 |
| | spacer | | 0.50 | 0.50 | 0.50 | 0.50 | 0.50 | 0.50 | 0.50 |

TABLE 1-continued

|  | Spacer dispersion liquid | | | | | | |
|---|---|---|---|---|---|---|---|
|  | A | B | C | D | E | RA | RB |
| Spacer particle diameter R (μm) | 2.5 | 4.5 | 4.5 | 4.5 | 6.0 | 4.5 | 4.5 |
| Surface tension of spacer dispersion liquid (mN/m) | 31.7 | 31.7 | 37.8 | 34.2 | 31.7 | 21.7 | 72.6 |
| Contact angle on substrate surface θ (°) | 44 | 44 | 58 | 50 | 44 | <5 | 77 |

(Location of Spacers by Ink-Jet Method)

A solution containing polyimide (Sunever 150, manufactured by Nissan Chemical Industry Co., Ltd.) was evenly applied by spin coating method to a color filter glass substrate provided with ITO transparent electrodes on the surface and bearing a black matrix with 25 μm width between the pixels (vertical length 150 μm×horizontal length 75 μm pitches) of the color filter and after the solution was dried at 150° C., the resulting substrate was fired at 230° C. for 1 hour for curing to obtain a substrate bearing an alignment layer. The obtained substrate was attached to a stage and the stage was heated by a heater attached to the stage to heat the substrate at 60° C.

Next, after the contact angle θ of the spacer dispersion liquid A on the substrate surface heated to 60° C. and was measured, the spacer dispersion liquid A was ejected to the substrate heated to 60° C. by a piezoelectric manner ink-jet apparatus having an ink-jet head with hole diameter 40 μm of the nozzle to locate spacers at 110 μm intervals in every other line of the vertical lines of the black matrix (vertical 110 μm×horizontal 150 μm pitches). The surface tension of the spacer dispersion liquid A at the time of ejection was 31.7 mN/m. Further, the location density of the spacers located in such a manner was 200 pieces/mm².

After it was confirmed that the spacer dispersion liquid A ejected on the substrate was completely dried with eye observation, to further dry and firmly fix spacers in the substrate, the substrate was moved on a hot plate heated at 150° C. for heating and then kept still for 30 minutes.

The obtained color filter glass substrate in which the spacers were located and an opposite substrate were stuck to each other using a circumferential seal material and the seal material were heated at 150° C. for 1 hour to cure the material and to form an empty cell with a cell gap equal to the particle diameter of the spacers and it was filled with a liquid crystal by vacuum method and an injection port was sealed with a sealing agent to obtain a liquid crystal display.

(Evaluation)

The relation between the spacer dispersion liquid and the interval of deposition D, the droplet state at the time the spacer dispersion was deposited on the substrate, the location state of the spacers after the droplets of the spacer dispersion liquid were dried, in the production steps of the liquid crystal display and the display image quality of the obtained liquid crystal display were evaluated according to the following standards.

The results are shown in Table 2.

<The Relation Between the Spacer Dispersion Liquid and the Interval of Deposition D>

◯: The relationship of the formula (1) was satisfied.

×: The relationship of the formula (1) was not satisfied.

<The Droplet Deposition State>

⊚: The deposition center of a droplet was at the position corresponding to a lattice point in a light shielding region.

◯: The deposition center of a droplet was at the position on a light shielding region.

shift: The deposition center of a droplet was shifted from a light shielding region.

Droplets are touched together: Droplets were touched together to be a large droplet.

There are positions where droplets are not deposited: No spacer was ejected out of some of nozzles of an ink-jet head to form parts where spacers were absent.

<Spacer Location Precision>

◯: Almost all of the spacers were on light shielding parts.

Δ: Some of spacers were at positions out of the light shielding regions.

×: Many spacers were at positions out of the light shielding regions.

<Display Image Quality>

◯: Spacers were scarcely observed in the display regions and the quality of images was good without light omission attributed to the spacers.

Δ: Some spacers were observed in the display regions and light omission attributed to the spacers took place.

×: Many spacers were observed in the display regions and light omission attributed to the spacers took place.

EXAMPLES 2 TO 6

0.50 parts by weight of spacers with an average particle diameter 4.5 μm and CV value 3.0% or spacers with an average particle diameter 6.0 μm and CV value 3.0% produced in the same manner as Example 1 were gradually added to dispersion media with the compositions shown in Table 1 and sufficiently stirred by a sonicator for dispersion and then filtered with a stainless mesh with 10 μm opening for agglomerate removal to obtain spacer dispersion liquid B, C, D, and E. Liquid crystal displays were fabricated in the same manner as Example 1, except that the spacer dispersion liquid B, C, D, and E were used as the spacer dispersion liquid as described in Table 2 and evaluated in the same manner.

The results were shown in Table 2.

EXAMPLES 7 AND 8

Liquid crystal displays were fabricated in the same manner as Examples 2 and 5, except that deposition positions of the droplets of the spacer dispersion liquid were adjusted to be at lattice points of the black matrixes.

The results were shown in Table 2.

COMPARATIVE EXAMPLES 1 TO 5

0.50 parts by weight of spacers with an average particle diameter 4.5 μm and CV value 3.0% produced in the same manner as Example 1 were gradually added to dispersion media with the compositions shown in Table 1 and sufficiently stirred by a sonicator for dispersion and then filtered with a stainless mesh with 10 μm opening for agglomerate removal to obtain spacer dispersion liquid B, C, E, RA and RB. Liquid crystal displays were fabricated in the same manner as Example 1, except that the spacer dispersion liquid B, C, E, RA, and RB were used as the spacer dispersion liquid as described in Table 2 and evaluated in the same manner.

The results were shown in Table 2.

TABLE 2

| | Spacer dispersion liquid | Spacer particle diameter (μm) | Surface tension of dispersion liquid (mN/m) | Contact angle of dispersion liquid on substrate (°) | Hole diameter of nozzle of ink-jet head (μm) | Spacer location intervals | | relationship of the formula (1) | Droplet deposition state | Spacer location precision | Display image quality |
|---|---|---|---|---|---|---|---|---|---|---|---|
| | | | | | | vertical (μm) | horizontal (μm) | | | | |
| Example 1 | A | 2.5 | 31.7 | 44 | 40 | 110 | 150 | ○ | ○ | ○ | ○ |
| Example 2 | B | 4.5 | 31.7 | 44 | 40 | 110 | 150 | ○ | ○ | ○ | ○ |
| Example 3 | C | 4.5 | 37.8 | 58 | 40 | 110 | 150 | ○ | ○ | ○ | ○ |
| Example 4 | D | 4.5 | 34.2 | 50 | 40 | 110 | 150 | ○ | ○ | ○ | ○ |
| Example 5 | E | 6.0 | 31.7 | 44 | 50 | 110 | 150 | ○ | ○ | ○ | ○ |
| Example 6 | C | 4.5 | 37.8 | 58 | 40 | 90 | 150 | ○ | ○ | ○ | ○ |
| Example 7 | B | 4.5 | 31.7 | 44 | 40 | 150 | 150 | ○ | ⊙ | ○ | ○ |
| Example 8 | E | 6.0 | 31.7 | 44 | 50 | 150 | 150 | ○ | ⊙ | ○ | ○ |
| Comparative Example 1 | B | 4.5 | 31.7 | 44 | 40 | 90 | 150 | x | Droplets are touched together. | x | x |
| Comparative Example 2 | E | 6.0 | 31.7 | 44 | 40 | 110 | 150 | ○ | partially shifted | Δ | Δ |
| Comparative Example 3 | C | 4.5 | 37.8 | 58 | 40 | 50 | 150 | x | Droplets are touched together. | x | x |
| Comparative Example 4 | RA | 4.5 | 21.7 | 5 | 40 | 150 | 150 | x | Droplets are touched together. | x | x |
| Comparative Example 5 | RB | 4.5 | 72.6 | 77 | 40 | 90 | 150 | ○ | There are positions where droplets are not deposited. | — | — |

In Examples 1 to 8, almost all of the spacers were located in non-display regions at high precision and the display image quality of the obtained liquid crystal displays was excellent. The display image quality of the liquid crystal displays obtained in Examples 7 and 8 were particularly excellent. On the other hand, the location precision of the spacers was low and the spacers were located even in display regions and displayed image quality of the liquid crystal displays was inferior in Comparative Examples 1 to 5.

INDUSTRIAL APPLICABILITY

In accordance with the present invention, a method of fabricating a liquid crystal display by which the light leakage and light omission due to spacers can be prevented and a liquid crystal display capable of displaying images with high quality at high resolution can be fabricated.

The invention claimed is:

1. A method of fabricating a liquid crystal display, which has a step of locating a spacer on a substrate by ejecting a droplet of spacer dispersion liquid containing a spacer with a particle diameter R (μm) from a nozzle of an ink-jet apparatus and depositing the droplet on the substrate surface, a hole diameter of the nozzle being 7R (μm) or larger, the spacer dispersion liquid having surface tension of 30 to 50 mN/m and a contact angle θ on the substrate surface of 30 to 90° and, in the step of locating the spacer on the substrate, depositing the droplet of the spacer dispersion liquid on the substrate surface at the interval of deposition D (μm) satisfying a relationship of the following formula (1):

$$D \geq 35 \times \left[ \frac{R}{2 - 3\cos\theta + \cos^3\theta} \right]^{1/3}. \quad (1)$$

2. The method of fabricating a liquid crystal display according to claim 1, which locates a spacer on a lattice point of a lattice light shielding region of a substrate A bearing a color filter having a pixel region located following a certain pattern and the lattice light shielding region defining the pixel region, or on a position of a substrate B to be set on the opposite side of the substrate A with a spacer and a liquid crystal interposed, corresponding to the lattice point of the lattice light shielding region of the substrate A.

* * * * *